United States Patent
Madsen et al.

(10) Patent No.: US 9,786,452 B2
(45) Date of Patent: Oct. 10, 2017

(54) MODULAR SWITCHING SYSTEM AND METHOD

(71) Applicant: Control4 Corporation, Salt Lake City, UT (US)

(72) Inventors: Brent Delbert Madsen, Salt Lake City, UT (US); Scott Edward Stephenson, Salt Lake City, UT (US)

(73) Assignee: Control4 Corporation, Salt Lake City, UT (US)

( * ) Notice: Subject to any disclaimer, the term of this patent is extended or adjusted under 35 U.S.C. 154(b) by 142 days.

(21) Appl. No.: 14/166,674

(22) Filed: Jan. 28, 2014

(65) Prior Publication Data
US 2015/0213978 A1    Jul. 30, 2015

(51) Int. Cl.
*H01H 23/12* (2006.01)
*H01H 13/7057* (2006.01)
*H02G 3/08* (2006.01)
*H02G 3/14* (2006.01)
*H01H 13/83* (2006.01)

(52) U.S. Cl.
CPC ........ *H01H 13/7057* (2013.01); *H02G 3/081* (2013.01); *H02G 3/14* (2013.01); *H01H 13/83* (2013.01); *H01H 2219/062* (2013.01); *H01H 2221/016* (2013.01); *H01H 2221/05* (2013.01); *H01H 2233/03* (2013.01); *H01H 2300/03* (2013.01); *Y02B 90/224* (2013.01); *Y04S 20/14* (2013.01)

(58) Field of Classification Search
CPC .................................. H01H 3/02; H01H 23/12
USPC ................... 200/5 A, 293, 339, 553; 174/50
See application file for complete search history.

(56) References Cited

U.S. PATENT DOCUMENTS

| | | | | |
|---|---|---|---|---|
| 5,803,243 A | * | 9/1998 | Nestor et al. | 200/556 |
| 5,957,273 A | * | 9/1999 | Karasik | H01H 11/0006 |
| | | | | 200/339 |
| 6,989,489 B1 | * | 1/2006 | Savicki, Jr. | 174/50 |
| 8,289,716 B2 | * | 10/2012 | Patel | H01H 3/122 |
| | | | | 361/728 |
| 2010/0214756 A1 | * | 8/2010 | Feldstein | 361/807 |
| 2012/0247935 A1 | * | 10/2012 | Goyal | H01H 13/83 |
| | | | | 200/5 A |

* cited by examiner

*Primary Examiner* — Edwin A. Leon
*Assistant Examiner* — Iman Malakooti
(74) *Attorney, Agent, or Firm* — Austin Rapp

(57) ABSTRACT

A switching system may include a body and a set of key elements. The body may be electrically connectable to a first electrical device and a second electrical device, and may have a keypad with key element attachment features to which the key elements can be attached. The key elements may be attachable in various positions and/or combinations on the keypad. The key elements may include one or more buttons of various sizes and/or a rocker. The keypad may have multiple positions to which key elements can be attached, with larger key elements requiring multiple positions. The key element attachment features may be domes, which may be inserted into holes in tabs extending from the key elements to pivotably attach the key elements to the keypad. Each key element may be retained on the keypad independently of any other component aside from the keypad and the key element.

19 Claims, 10 Drawing Sheets

MODULAR SWITCHING SYSTEM AND METHOD

TECHNICAL FIELD

The present invention relates to electrical switches, and more particularly, to modular switching elements for use in homes, office buildings, and the like.

BACKGROUND

A wide variety of switches are used to control electrical devices. Such switches range in function from simple on/off switches that simply open circuits, to digital switches capable of transmitting wireless commands for home automation or the like. As applied to homes, office buildings, and other structures, switches can be used to control a wide variety of electrical devices such as lights, appliances, security systems, window coverings, heating and cooling equipment, and the like. Many structures have a plethora of switches, which may detract from the aesthetics of the space.

Further, a large number of switches can be confusing for users. When faced with an array of switches, it can be a daunting prospect for a user to determine or remember which switch controls a given electrical device. This problem is exacerbated by the fact that prior art switches are often made identical to each other. User customization is often not possible.

It would be advantageous to provide switching systems that avoid disruption to interior aesthetics and are easily navigated by a user. It would be a benefit to provide such systems with switches that are readily distinguishable from each other.

SUMMARY

The present invention may remedy the shortcomings of prior art switching systems. This may be accomplished through the use of a configurable switching system. Such a switching system may have a body with a keypad to which multiple key elements may be attached. The key elements may be actuated by the user to provide switching functionality. Key elements of different sizes and/or types may be provided, including but not limited to buttons and rockers.

The key elements may be attachable in various positions and/or combinations on the keypad. The keypad may have a plurality of key element attachment features that mate with corresponding keypad attachment features of the key elements. The key element attachment features may be domes and the keypad attachment features may be tabs with holes that extend toward the keypad. In order to attach a key element to the keypad, two domes of the keypad may be inserted into the holes of the tabs of the key element such that the key element is pivotably attached to the keypad. Each key element may be retained on the keypad independently of any other component aside from the keypad and the key element.

The keypad may have several positions to which key elements can be attached, with larger key elements requiring multiple positions. The positions may be arranged in a line, and may be arranged vertically and/or horizontally along the length of the keypad. The key elements may include one or more small buttons that only occupy one position, one or more medium-sized buttons that occupy two positions, and one or more large buttons that occupy three positions. Each of the buttons may have a contact surface that can be pressed to perform a single switching function. A protrusion extending from the button toward the keypad may interface with the body to perform the switching function.

Additionally or alternatively, the key elements may include a rocker switch with two contact surfaces that can be pressed to pivot the rocker switch in either of two directions. The rocker switch may occupy all of the positions. The rocker switch may have protrusions positioned at either end of the rocker switch to interface with the body to selectively perform either of two switching functions, depending on which contact surface is pressed. A smaller rocker may also be provided, and may occupy fewer than all of the positions.

Additionally or alternatively, the key elements may include a split button with two or more contact surfaces. The split button may occupy two or more positions, and may have multiple protrusions that can be independently urged toward the keypad to perform multiple switching functions.

In operation, the user may connect the body to one or more electrical devices to be controlled with the switching system. This may entail a wired and/or wireless connection. The body may be mounted on a wall or other location. The desired key element(s) may be selected, and the desired position for each key element may also be selected. Then, the selected key elements may be attached to the keypad in the desired arrangement. The various contact surfaces of the key elements may then be pressed by the user to control the various electrical devices to which the body is connected.

Through the present invention, multiple electrical devices may beneficially be controlled through the use of one switching system. The switching system may beneficially provide customization of the manner in which key elements are arranged to control the electrical devices. Such a switching system may take the place of several conventional switches.

DETAILED DESCRIPTION

Various embodiments of the invention will now be described in greater detail in connection with FIGS. 1-10. The drawings and associated descriptions are merely exemplary; the scope of the invention is defined not by these, but by the appended claims.

Figure 1:
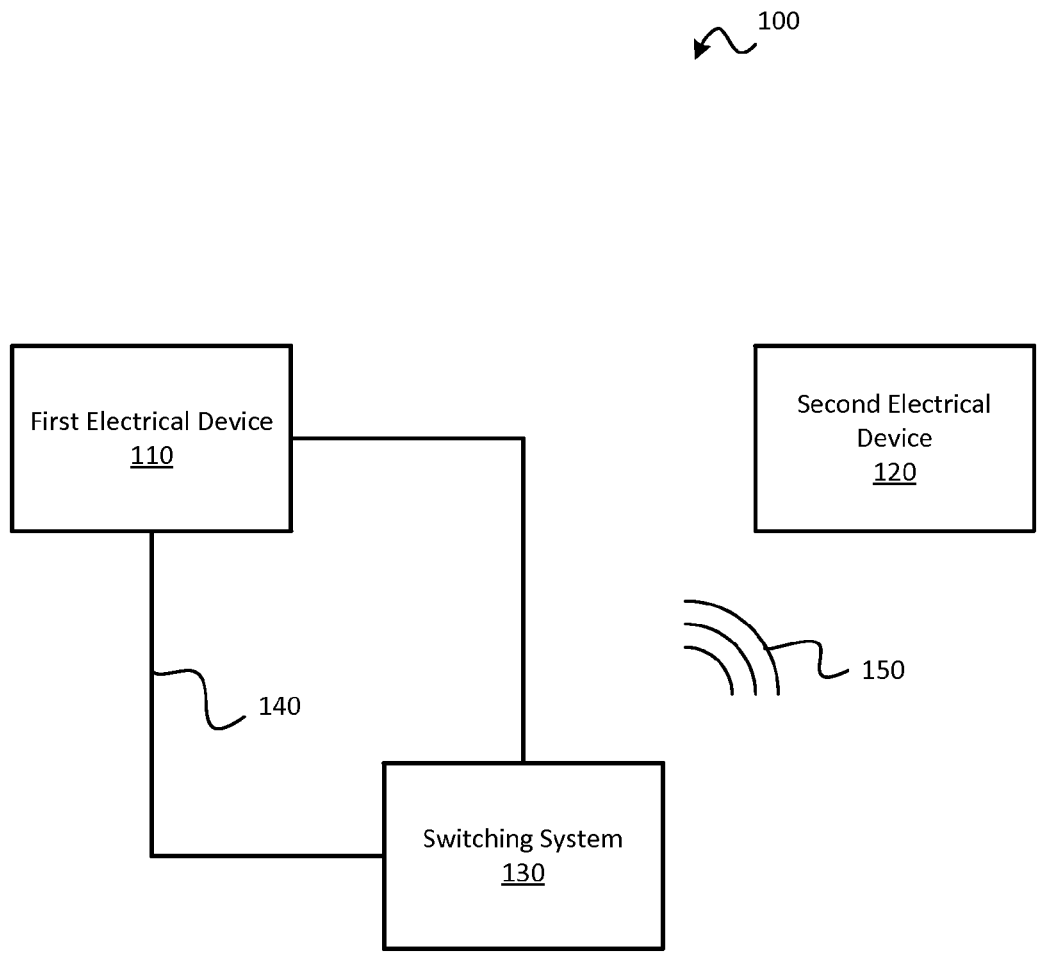
FIG. 1 is a schematic view of a system for controlling electrical devices according to one embodiment of the invention.

Referring to FIG. 1, a schematic view illustrates a system 100 for controlling electrical devices according to one embodiment of the invention. The system 100 may be a portion of an electrical system and/or automation system or the like. If desired, the system 100 may be used in a home, office, industrial building, or other inhabited structure.

The system 100 may include one or more electrical devices to be controlled with the system 100. The electrical devices may include a first electrical device 110 and a second electrical device 120. The first electrical device 110 and the second electrical device 120 may include devices such as lights, fans, window coverings, electrical appliances, entertainment systems, security systems, and the like.

The system 100 may also include a switching system 130 that is connected to the first electrical device 110 and the second electrical device 120. The switching system 130 may have connectors that connect the switching system 130 to the first electrical device 110 and the second electrical device 120. By way of example, the connectors may include electrical terminals or the like that enable a wired connection to be made with the first electrical device 110 via electrical wiring 140. Additionally or alternatively, the connectors may include one or more wireless communications devices that enable a wireless connection to be made with the second electrical device 120 via a wireless signal 150.

The electrical wiring 140 may be part of an electrical system of an inhabited structure, such as a 110 Volt or 220 Volt 50 Hz or 60 Hz Alternating Current (A/C) system. Thus, the electrical wiring 140 may include wiring of a type commonly used in the construction of such electrical systems. Alternatively, the electrical wiring 140 may exist apart from such an electrical system, and may thus include wiring designed to operate at a different current and/or voltage.

The system 100 may utilize a wide variety of wired and/or wireless technologies, including any known wired and/or wireless communications protocol. Such wireless communications protocols include, but are not limited to, Ethernet, HTTP, ZigBee, IEEE 802.15.4, 2.4 GHz, 15-channel spread spectrum radio, Wi-Fi, Bluetooth, Bluetooth Smart, NFC (near field communication), and the like. The wired and/or wireless communication between the switching system 130 and the second electrical device 120 may be one-way (i.e., from the switching system 130 to the second electrical device 120), or two-way (i.e., incorporating feedback or other signals from the second electrical device 120 to the switching system 130 in addition to the signals transmitted by the switching system 130 to the second electrical device 120).

The switching system 130 may be used to simply turn the first electrical device 110 and/or the second electrical device 120 on or off. Thus, the switching system 130 may open or close a circuit (i.e., to turn the first electrical device 110 on or off), or may provide instructions to a separate relay or switching element to open or close a circuit. Additionally or alternatively, the switching system 130 may provide other switching functions such as varying the resistance, inductance, or capacitance of a circuit or providing instructions to a separate relay or resistance element to open or close a circuit. Hence, the switching system 130 may be used to perform a dimming function for lighting, a motor speed control function, or the like.

The switching system 130 may be compatible with a wide variety of electrical devices that incorporate motors, lighting elements, heating elements, and other electrically-driven components. In addition to conventional incandescent and fluorescent lighting, the switching system 130 may be compatible with lighting technologies such as compact fluorescent lights (CFL) and light-emitting diode (LED) lights.

In addition to or in the alternative to analog control, the switching system 130 may provide switching functions in the form of commands that control the operation of the first electrical device 110 and/or the second electrical device 120 in a different manner. Such commands may be digital instructions that are interpreted by digital processing circuitry within the first electrical device 110 and/or the second electrical device 120. In one embodiment, provided by way of example, the first electrical device 110 may optionally be a home heating unit that can be set to heat a home to a selected temperature via a command from the switching system 130, and the second electrical device 120 may be a digital video recorder (DVR) that is set to record a selected broadcast via another command from the switching system 130.

Thus, it can be seen that the switching system 130 may communicate in a wired and/or wireless manner, and may control the first electrical device 110 and/or the second electrical device 120 via analog or digital communication. Simple and/or complex control functions may be performed.

Figure 2:
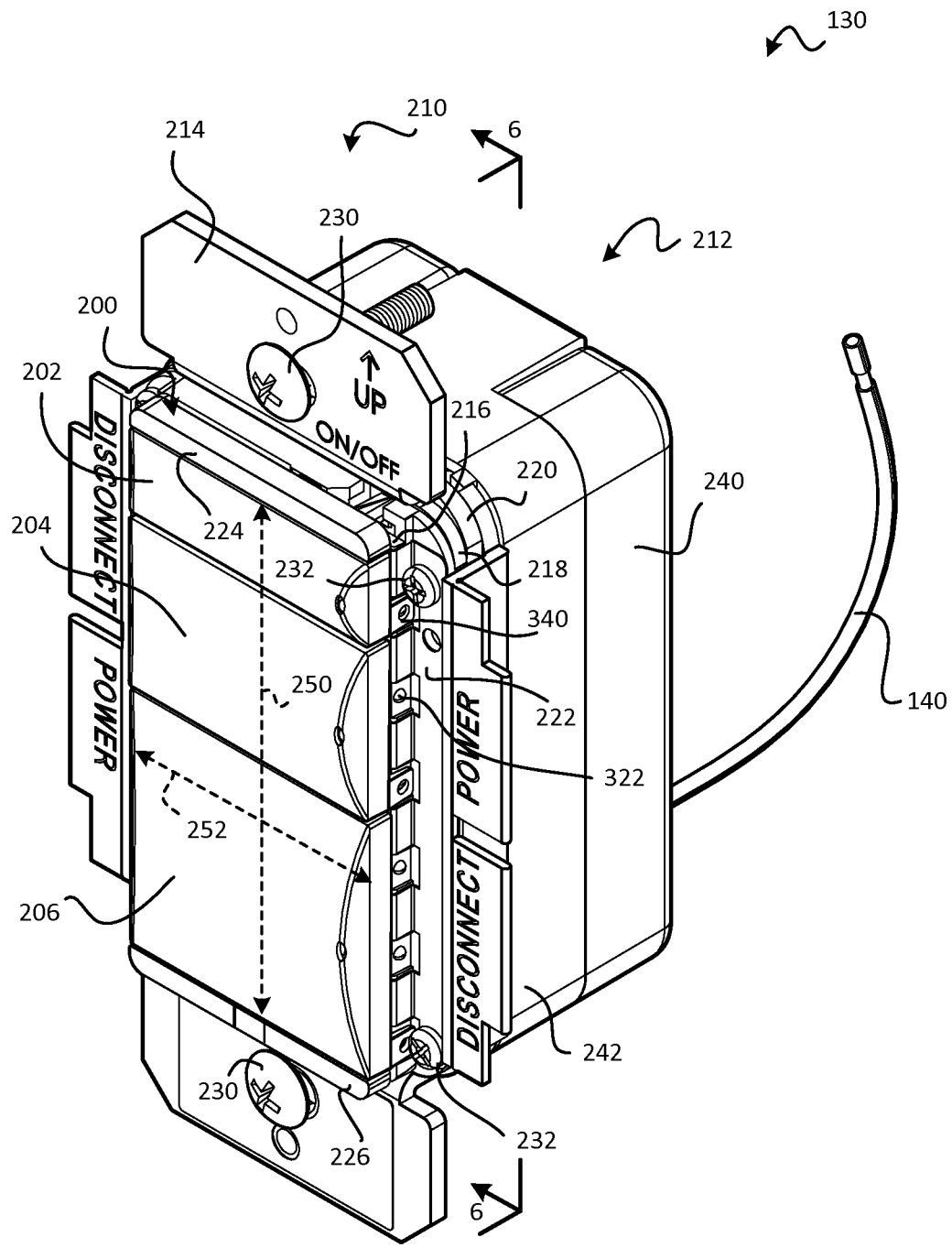
FIG. 2 is a perspective view of the switching system of the system of FIG. 1, in a fully-assembled state with key elements including a small button, a medium-sized button, and a large button.

Referring to FIG. 2, a perspective view illustrates the switching system 130 of the system of FIG. 1, in a fully-assembled state. The switching system 130 may include a plurality of key elements 200, which may include a small key element 202, a medium-sized key element 204, and a large key element 206. The switching system 130 may also include a body 210, which may include several other components.

More precisely, the body 210 may include a shell 212, a mounting flange 214, a keypad 216, and a circuit board 218. The shell 212 may be designed to fit into and/or take the place of a standard junction box. The shell 212 may contain connectors and/or other items used to connect the switching system 130 to the electrical wiring 140 and/or provide the wireless signal 150. The mounting flange 214 may project outward from the shell 212, and may be used to mount the switching system 130 to a structure such as a wall, junction box, or the like. The keypad 216 may receive the key elements 200. The circuit board 218 may receive the user input provided via the key elements 200 and initiate the desired action in the first electrical device 110 and/or the second electrical device 120.

The shell 212, the mounting flange 214, the keypad 216, and/or the circuit board 218 may be secured together via a variety of spacers, fasteners, and/or other interconnecting elements. As embodied in FIG. 2, these may include a spacer 220 and a retention plate 222. The spacer 220 may be used to provide the desired spacing between the mounting flange 214 and the circuit board 218. The retention plate 222 may be used to secure the keypad 216, the circuit board 218, and the mounting flange 214 to the shell 212.

In addition to the components listed above, the body 210 may have various other features, which serve ornamental or other functions. Such features may include, but are not limited to, a top trim piece 224, and bottom trim piece 226.

The top trim piece 224 may act as an actuator for an air-gap switch or the like. The bottom trim piece 226 may be a support for a "light pipe," which may transmit ambient light to a light sensor (for example, on the circuit board 218) to enable detection of ambient lighting levels.

The body 210 may be attached to a wall or other structure via screws 230, which may be inserted through holes in the mounting flange 214 and into corresponding holes in the applicable mounting structure. The retention plate 222 may be secured to the keypad 216, the circuit board 218, and the mounting flange 214 via screws 232. The screws 232 may pass through holes in the corners of the retention plate 222, and through corresponding holes of the keypad 216, the circuit board 218, and/or the mounting flange 214.

The shell 212 may have multiple parts that fit together to define an interior cavity to hold wire ends, connectors, and the like. More specifically, the shell 212 may have a first portion 240 and a second portion 242, which may be attachable together via screws, snap fittings, or the like.

As shown, the body 210 may be generally rectangular prismatic in shape, and may thus have a length that is greater than its width. The keypad 216 may similarly have a generally rectangular shape with a length 250 and a width 252. The length 250 may be greater than the width 252. The key elements 200 may be distributed along the length, and may be positioned adjacent to each other so that only very small gaps exist between the key elements 200 that are adjacent to each other.

The key elements 200 shown in FIG. 2 may be only some of those that are supplied with the switching system 130. If desired, multiple key elements 200 of each type and/or other types not shown in FIG. 2 may be provided. Thus, the key elements 200 and/or other key elements not shown in FIG. 2 may be arranged in a variety of configurations according to the invention. This will be further shown and described subsequently.

Figure 3:
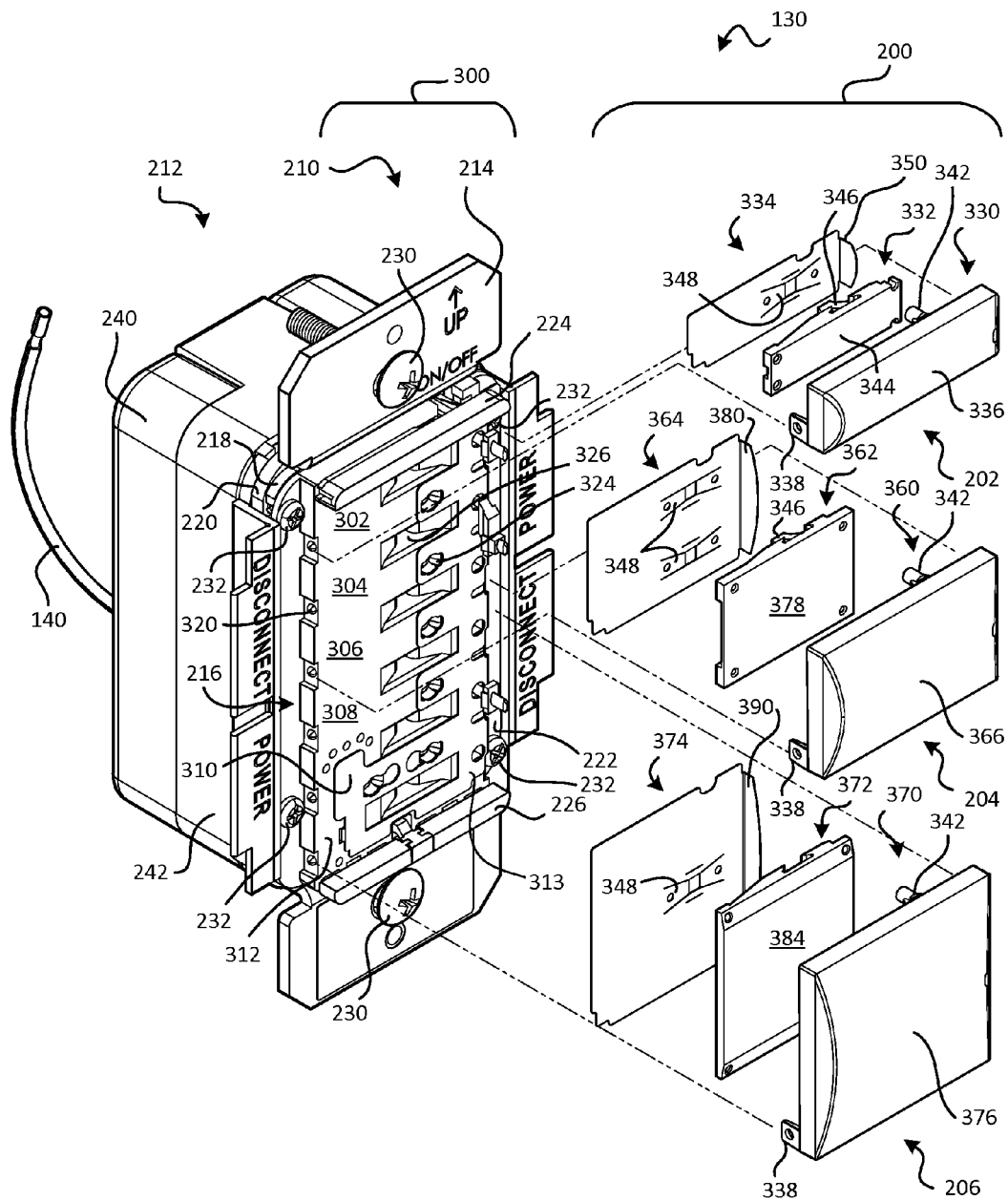
FIG. 3 is an exploded, perspective view of the switching system of FIG. 1.

Referring to FIG. 3, an exploded, perspective view illustrates the switching system 130 of FIG. 1. As shown, the key elements 200 have been removed from the keypad 216 to enable clearer visualization of the key elements 200 and the keypad 216. A portion of the keypad 216 may be covered and/or retained by the retention plate 222, as illustrated.

The keypad 216 may have a plurality of positions 300 that may be occupied by the key elements 200. Each of the positions 300 may correspond to the smallest of the key elements 200, so that other key elements 200 occupy more than one of the positions 300. In the embodiment of FIG. 3, the positions 300 on the keypad 216 may include a first position 302, a second position 304, a third position 306, a fourth position 308, a fifth position 310, a sixth position 312, and a seventh position 313.

Each of these positions 300 may occupy a generally rectangular area spanning the width 252 of the keypad 216, with the exception of the sixth position 312 and the seventh position 313. The sixth position 312 and the seventh position 313 may be positioned side-by-side such that, combined, they span the width 252 of the keypad 216. The positions 300 may be arranged along the length 250 of the keypad 216 so that each of the positions 300 is vertically offset from the others. Again, the sixth position 312 and the seventh position 313 may be an exception because they may be vertically aligned with each other.

In alternative embodiments (not shown), a keypad may have more or fewer positions than those that are illustrated in FIG. 3.

Each of the positions 300 may include certain features. The features present on each of the positions 300 may include key element attachment features that cooperates with corresponding keypad attachment features on each of the key elements 200 to facilitate attachment of the key elements 200 to the keypad 216. The key element attachment features and the keypad attachment features may include a wide variety of structures known in the art, including but not limited to threaded fasteners, dovetailing fasteners, grippers, and the like.

The key element attachment features and the keypad attachment features are not limited to mechanical fastening, but may, in alternative embodiments, utilize chemical bonding, adhesive bonding, thermal bonding, and/or any other known technique for attaching parts together. The key element attachment features and the keypad attachment features may be beneficially movably attached together so that the key elements 200 are able to move relative to the keypad 216. The relative motion may include translation, rotation, or combinations thereof.

In alternative embodiments, key elements (not shown) different from the key elements 200 may optionally be used. The key elements may be rigidly secured to the key element attachment features. Switching may then occur in response to user actuation in such a manner that the key elements need not move significantly relative to the keypad. Switching may then occur in response to flexure of the key elements and/or to pressure on the key elements that is exerted without causing significant motion of the key elements.

Returning to the embodiment of FIG. 3, the key element attachment features and the keypad attachment features may be designed to permit pivotal motion of the key elements 200 relative to the keypad 216. Thus, when pressed by a user, the key elements 200 may perceptibly move, and may optionally provide an audible or tactile "click" when pressed far enough to activate switching.

The key element attachment features may have many configurations. Any of a wide variety of clips, clasps, revolute joints, flexural pivots ("living hinges"), polyaxial joints, and/or the like may be used. More specifically, the key element attachment features may include conical shapes, prisms, tetrahedrons, pyramids and/or other axisymmetrical shapes. Alternatively, asymmetrical shapes may be used. According to some embodiments, the key element attachment features may have generally cylindrical shapes with ends that are beveled at an angle non-perpendicular to the side wall of the cylinder. Such a beveled end may facilitate attachment, for example, by causing the keypad attachment features to flex outward relative to the key element attachment features, and then snap back into position with the key element attachment features in engagement with the keypad attachment features. Such an arrangement may also make it more difficult to detach the key elements from the keypad, thereby preventing accidental detachment.

In the embodiment of FIG. 3, the key element attachment features may include a first dome 320 and a second dome 322 (shown in FIG. 2). The first dome 320 and the second dome 322 of each of the positions 300 may be generally hemispherical in shape, and may be substantially coaxial with each other. The first dome 320 and the second dome 322 may have a variety of shapes, including but not limited to hemispherical shapes, semispherical shapes (i.e., sectorial portions of spheres that are not necessarily hemispherical), elliptical shapes, parabolic shapes, and the like.

In addition to the first dome 320 and the second dome 322, each of the positions 300 may have a port 324 and an illumination aperture 326. Each port 324 may be positioned over a corresponding location on the circuit board 218 at which there is a switching element that can be activated via pressure. A feature of each key element 200 may protrude through the port 324 to press on the corresponding portion of the circuit board in response to user actuation of the key element 200, as will be described subsequently.

Each illumination aperture 326 may be positioned over a corresponding location on the circuit board 218 at which there is a light source such as an LED light. Light from the light source may shine through the illumination aperture 326 to backlight the key element 200 that occupies its corresponding position of the positions 300 on the keypad 216, as will also be described subsequently.

Lighting may be used to enhance the overall appearance of the switching system 130. If desired, the colors, brightness, flash pattern, or other aspects of light emitted by the light sources may vary across the positions 300 and/or vary over time to provide a desired ornamental effect and/or help the user distinguish which of the key elements 200 may be used to initiate each switching function. Such lighting parameters of the switching system 130 may be user-configurable and customizable, if desired.

As mentioned previously, the key elements 200 may include key elements 200 of various shapes and sizes. The key elements 200 illustrated in FIG. 3 need not be the only ones provided with the switching system 130. If desired, the switching system 130 may be provided with more key elements 200 than will fit on the keypad 216 at any one time, so that the user can choose from among several key elements 200 to select a subset that most matches his or her needs.

As indicated previously, the key elements 200 may include a small key element 202, a medium-sized key element 204, and a large key element 206. The small key element 202 may include multiple components, such as a small button 330, a small light bar 332, and a small retainer 334. The small button 330 may only occupy a single position of the positions 300. Thus, if desired, six small buttons 330 may be attached to the keypad 216, with one small button 330 attached at each of the positions 300.

The small button 330 may have a contact surface 336 that is shaped to be pressed by a user. The contact surface 336 may be rounded as shown. The contact surface 336 may be smooth, or may have surface texturing to provide the desired feel when touched by a digit (i.e., a finger or thumb) of a user.

The small button 330 may also have a first keypad attachment feature 338 and a second keypad attachment feature 340 (shown in FIG. 2, FIG. 4, and FIG. 5), which may cooperate with the first keypad attachment feature 338 to attach the small button 330 to the keypad 216. The first keypad attachment feature 338 may mate with the first dome 320, and the second keypad attachment feature 340 may mate with the second dome 322. This mating may be in a manner that permits the small button 330 to rotate relative to the keypad 216 about the axis shared by the first dome 320 and the second dome 322. The configuration and function of the first keypad attachment feature 338 and the second keypad attachment feature 340 will be shown and described in connection with FIG. 4 and FIG. 5.

The small button 330 may also have a protrusion 342 that extends toward the keypad 216. When the small button 330 is attached to one of the positions 300 (for example, the first position 302), the protrusion 342 may extend into the port 324 of the first position 302. Pressure on the contact surface 336 may cause the small button 330 to rotate toward the keypad 216 such that the protrusion 342 extends further into the port 324 of the first position 302. The end of the protrusion 342 may contact and/or exert pressure on a switching element (not shown) on the circuit board 218, which may cause switching to occur.

The small light bar 332 may nest within the small button 330, as will be shown in greater detail subsequently. The small light bar 332 may have an illumination surface 344, which may be positioned interior to the contact surface 336 when the small light bar 332 is nested within the small button 330. The small light bar 332 may also have a plateau 346 that extends toward the keypad 216 and protrudes into the illumination aperture 326 at the position (for example, the first position 302) occupied by the small key element 202.

The small light bar 332 may be formed of a translucent material such that light received from the illumination aperture 326 passes through the plateau 346 and through the small light bar 332 to the illumination surface 344. At the contact surface 336, the small button 330 may have a thickness and material composition selected to provide translucency such that the light from the illumination surface 344 shows through the contact surface 336 and is visible to the user. The geometry of the small light bar 332 may facilitate relatively even distribution of light from the plateau 346 across the illumination surface 344, thereby illuminating the small button 330 and/or any associated engravings, decals, or the like.

The small retainer 334 may also nest within the small button 330, and may serve to hold the small light bar 332 in place relative to the small button 330. The small retainer 334 may have a plateau receiver 348 that receives the plateau 346 of the small light bar 332 and enables the plateau 346 to pass through the small retainer 334 to receive light from the illumination aperture 326. The small retainer 334 may also have an attachment tab 350 that facilitates attachment of the small retainer 334 to the small button 330.

The medium-sized key element 204 and the large key element 206 may be configured in a manner similar to that set forth above in the description of the small key element 202, except that the medium-sized key element 204 may be larger than the small key element 202, and the large key element 206 may be larger than the medium-sized key element 204. More specifically, while the small key element 202 may occupy only one of the positions 300 as described above, the medium-sized key element 204 may occupy two of the positions 300 and the large key element 206 may occupy three of the positions 300.

The medium-sized key element 204 may have a medium-sized button 360, a medium-sized light bar 362, and a medium-sized retainer 364, which may nest together in a manner similar to that of the small button 330, the small light bar 332, and the small retainer 334 of the small key element 202. The medium-sized button 360 may have a contact surface 366, a first keypad attachment feature 338, a second keypad attachment feature 340, and a protrusion 342, which may be configured substantially as described above.

Similarly, the medium-sized light bar 362 may have an illumination surface 378 and the medium-sized retainer 364 may have an attachment tab 380 similar to the attachment tab 350 of the small retainer 334. If desired, the medium-sized light bar 362 may have two plateaus 346, and the medium-sized retainer 364 may have two plateau receivers 348 that are spaced apart to receive the plateaus 346. Since the medium-sized key element 204 may occupy two of the positions 300, the medium-sized light bar 362 may be illuminated through two of the illumination apertures 326 of the keypad 216. Instead, if desired, the medium-sized retainer 364 may be made to receive light from only one of the illumination apertures 326.

The large key element 206 may have a large button 370, a large light bar 372, and a large retainer 374, which may nest together in a manner similar to that of the small button 330, the small light bar 332, and the small retainer 334 of the small key element 202. The large button 370 may have a contact surface 376, a first keypad attachment feature 338, a second keypad attachment feature 340, and a protrusion 342, which may be configured substantially as described above.

Similarly, the large light bar 372 may have an illumination surface 384 and a plateau 346, and the large retainer 374 may have a plateau receiver 348 and an attachment tab 390 similar to the attachment tab 350 of the small retainer 334. If desired, the large light bar 372 may alternatively have two or three plateaus 346, since it occupies three of the positions 300. In such an event, the large retainer 374 may be modified to have two or three plateau receivers 348.

The small key element 202, the medium-sized key element 204, and the large key element 206 are all merely exemplary; a wide variety of other key elements (not shown) may be used. Such key elements may include a variety of switches including levers, buttons, and the like. Such key elements may also include sliding switches, knobs, and/or other controls that provide a range of adjustability in addition to or in place of simple binary (for example, on/off) functionality. Additionally or alternatively, the key elements may include one or more blanks that can be used to cover and/or protect any positions 300 on the keypad 216 that will not be otherwise occupied.

Figure 4:
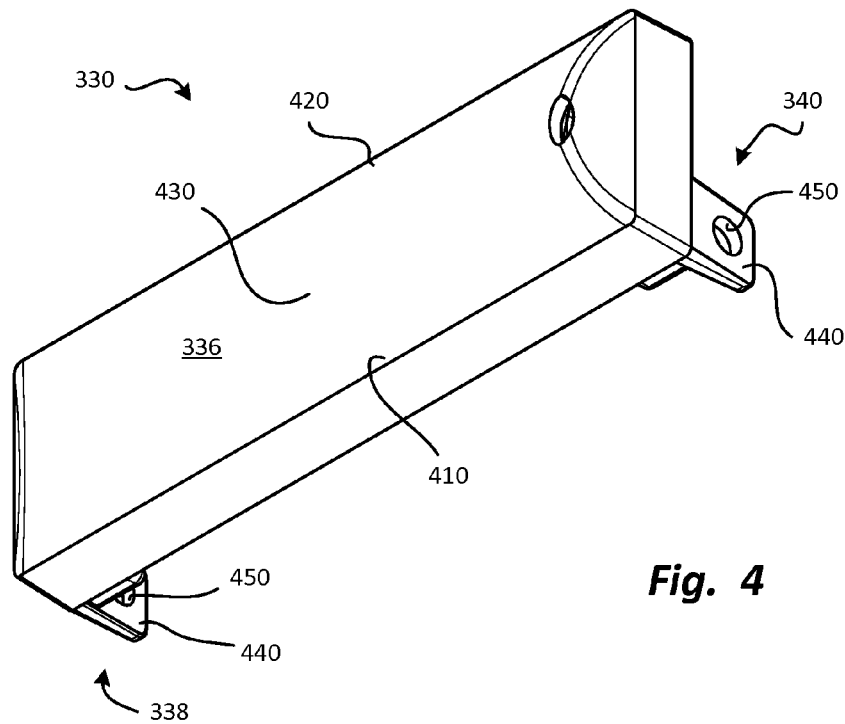
FIG. 4 is a perspective view of a front side of the small button of the switching system of FIG. 1.

Referring to FIG. 4, a perspective view illustrates a front side of the small button 330 of the switching system 130 of FIG. 1. As shown, the small button 330 may have a first end 410, a second end 420, and an intermediate portion 430 between the first end 410 and the second end 420. The first keypad attachment feature 338 and the second keypad attachment feature 340 may be positioned on the first end 410. The protrusion 342 may be positioned on the second end 420. The contact surface 336 may be positioned on the intermediate portion 430.

As mentioned previously, the first keypad attachment feature 338 and the second keypad attachment feature 340 may have a wide variety of configurations according to the invention. As shown in FIG. 4, the first keypad attachment feature 338 and the second keypad attachment feature 340 may each have a tab 440 with a hole 450 that passes through the tab 440. The hole 450 of the first keypad attachment feature 338 may be substantially collinear with the hole 450 of the second keypad attachment feature 340.

The first keypad attachment feature 338 may be mated with the first dome 320 by inserting the first dome 320 into the hole 450 of the first keypad attachment feature 338. Similarly, the second keypad attachment feature 340 may be mated with the second dome 322 by inserting the second dome 322 into the hole 450 of the second keypad attachment feature 340. These two mating steps may cooperate to attach the small button 330 to the keypad 216.

As shown in FIG. 2 and FIG. 3, the first dome 320 and the second dome 322 of each of the positions 300 may protrude outward. The first dome 320 and the second dome 322 may be collinear as described above, and may also be spaced relative to each other at approximately the same spacing (or a slightly smaller spacing) as that which exists between the tabs 440 of the first keypad attachment feature 338 and the second keypad attachment feature 340. The spacing between the tabs 440 may advantageously be small enough that the first dome 320 and the second dome 322 are unable to be inserted into the holes 450 without some outward motion of the tabs 440.

Thus, in order to attach the small button 330 to one of the positions 300, the tabs 440 may be flexed gently outward to enable the first dome 320 and the second dome 322 to pass into the holes 450. In the alternative, flexure of the contact surface 336 may be performed to angle the tabs 440 apart from each other to enable them to fit around the first dome 320 and the second dome 322.

Once the tabs 440 have cleared the first dome 320 and the second dome 322 such that the first dome 320 and the second dome 322 are aligned with the holes 450, the tabs 440 may snap back into their undeflected configuration in which they are substantially parallel to each other, as shown in FIG. 4. The first dome 320 and the second dome 322 may, at this point, be positioned in the hole 450 of the first keypad attachment feature 338 and in the hole 450 of the second keypad attachment feature 340, respectively.

Advantageously, through the use of the first and second key element attachment features (for example, the first dome 320 and the second dome 322) and the first keypad attachment feature 338 and the second keypad attachment feature 340, the small key element 202 may be attached to the keypad 216 independently of any component aside from the small key element 202 and the keypad 216.

Thus, no separate retainer, frame, fastener, or other component is required to be added to the small key element 202 or the keypad 216 in order to keep the small key element 202 in place relative to the keypad 216. This may advantageously reduce the number of parts the user needs to deal with in order to configure the switching system 130 for use, and may also reduce the number of steps required.

Further, this may reduce the "fiddle factor" that otherwise may be present. If the user were required to arrange the key elements 200 on the keypad 216 and then apply one or more separate components to attach them to the body 210, the key elements 200 may fall out of place before they can be securely attached. Attachment of the key elements 200 to the keypad 216 independently of any other component is particularly beneficial because it may allow the body 210 to be mounted prior to attachment of the key elements 200 to the keypad 216. If a separate attachment component and/or attachment step were required, attachment of the key elements 200 to the keypad 216 may otherwise be difficult or impossible to accomplish with the keypad 216 in the vertical orientation in which it will likely be mounted.

Figure 5:
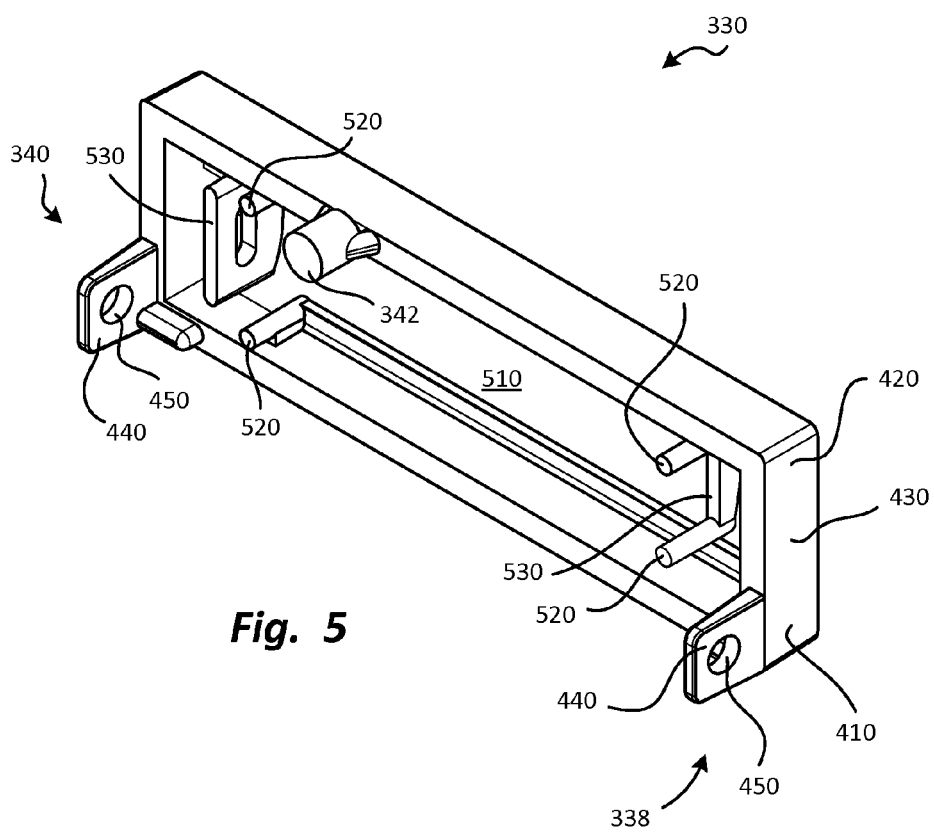
FIG. 5 is a perspective view of a rear side of the small button of the switching system of FIG. 1.

Referring to FIG. 5, a perspective view illustrates a rear side of the small button 330 of the switching system 130 of FIG. 1. The position of the protrusion 342 on the second end 420 of the small button 330 is more particularly shown. The rear side of the small button 330 may be shaped to define a cavity 510, which may contain the small light bar 332 and the small retainer 334.

A variety of posts 520 and/or flanges 530 may be provided within the cavity 510. The posts 520 and/or the flanges 530 may help to properly position the small light bar 332 and/or the small retainer 334 within the cavity 510. Additionally or alternatively, the posts 520 and/or the flanges 530 may serve a structural purpose by ensuring that the small button 330 has the desired level of strength and flexural rigidity.

Figure 6:
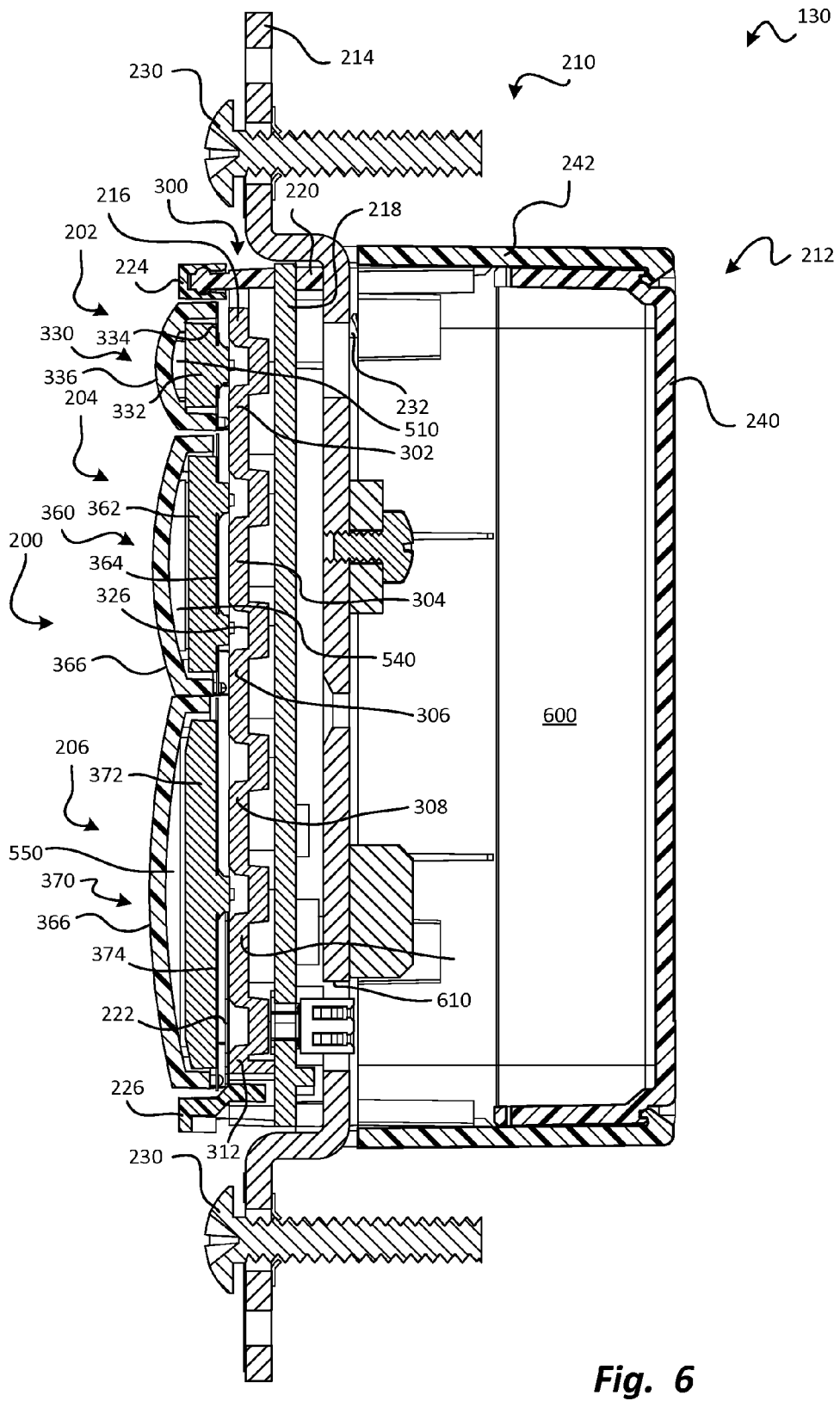
FIG. 6 is a side elevation, section view of the switching system of FIG. 1, in a fully-assembled state with the small button, medium-sized button, and large button of FIG. 2.

The medium-sized button 360 and the large button 370 are not shown from a rearward vantage point, but may have a cavity 540 and a cavity 550, respectively (shown in FIG. 6). The cavity 540 and the cavity 550 may have features similar to the posts 520 and flanges 530 illustrated in FIG. 5.

Referring to FIG. 6, a side elevation, section view through the lines labeled 6-6 of FIG. 2 illustrates the switching system 130 of FIG. 1, in a fully-assembled state with the small button 330, the medium-sized button 360, and the large button 370 of FIG. 2. The section view of FIG. 6 more clearly illustrates the interior of the shell 212, which may define a cavity 600. The mounting flange 214 may have a port 610 bordering the cavity 600 to provide access to the cavity 600 for wiring from the circuit board 218.

Additionally, FIG. 6 more clearly illustrates the manner in which the small light bar 332 and the small retainer 334 nest within the small button 330 of the small key element 202. The medium-sized key element 204 and the large key element 206 may be assembled in a similar manner.

As also depicted in FIG. 6, the small key element 202 may occupy the first position 302, the medium-sized key element 204 may occupy the second position 304 and the third position 306, and the large key element 206 may occupy the fourth position 308, the fifth position 310, the sixth position 312, and the seventh position 313. When a user presses on the contact surface 336 of the small button 330, the top end (i.e., the second end 420 shown in FIG. 4 and in FIG. 5) of the small button 330 may pivot toward the keypad 216 such that the protrusion 342 of the small button 330 (not shown in FIG. 6) is pressed into the port 324 of the first position 302. This may activate the switching element (not shown) of the circuit board 218 underlying the port 324 of the first position 302 to initiate the switching function corresponding to the first position 302.

Similarly, when a user presses on the contact surface 366 of the medium-sized button 360, the top end of the medium-sized button 360 may pivot toward the keypad 216 such that the protrusion 342 (not shown in FIG. 6) of the medium-sized button 360 is pressed into the port 324 of the second position 304. This may activate the switching element (not shown) of the circuit board 218 underlying the port 324 of the second position 304 to initiate the switching function corresponding to the second position 304.

Similarly, when a user presses on the contact surface 376 of the large button 370, the top end of the large button 370 may pivot toward the keypad 216 such that the protrusion 342 (not shown in FIG. 6) of the large button 370 is pressed into the port 324 of the fourth position 308. This may activate the switching element (not shown) of the circuit board 218 underlying the port 324 of the fourth position 308 to initiate the switching function corresponding to the fourth position 308.

As mentioned previously, a variety of other key elements 200 may be used besides the small key element 202, the medium-sized key element 204, and the large key element 206. One type of key element that may be provided with and/or used in connection with the switching system 130 is a rocker, which may be moved by the user to either of two positions to carry out two distinct switching functions.

Figure 7:
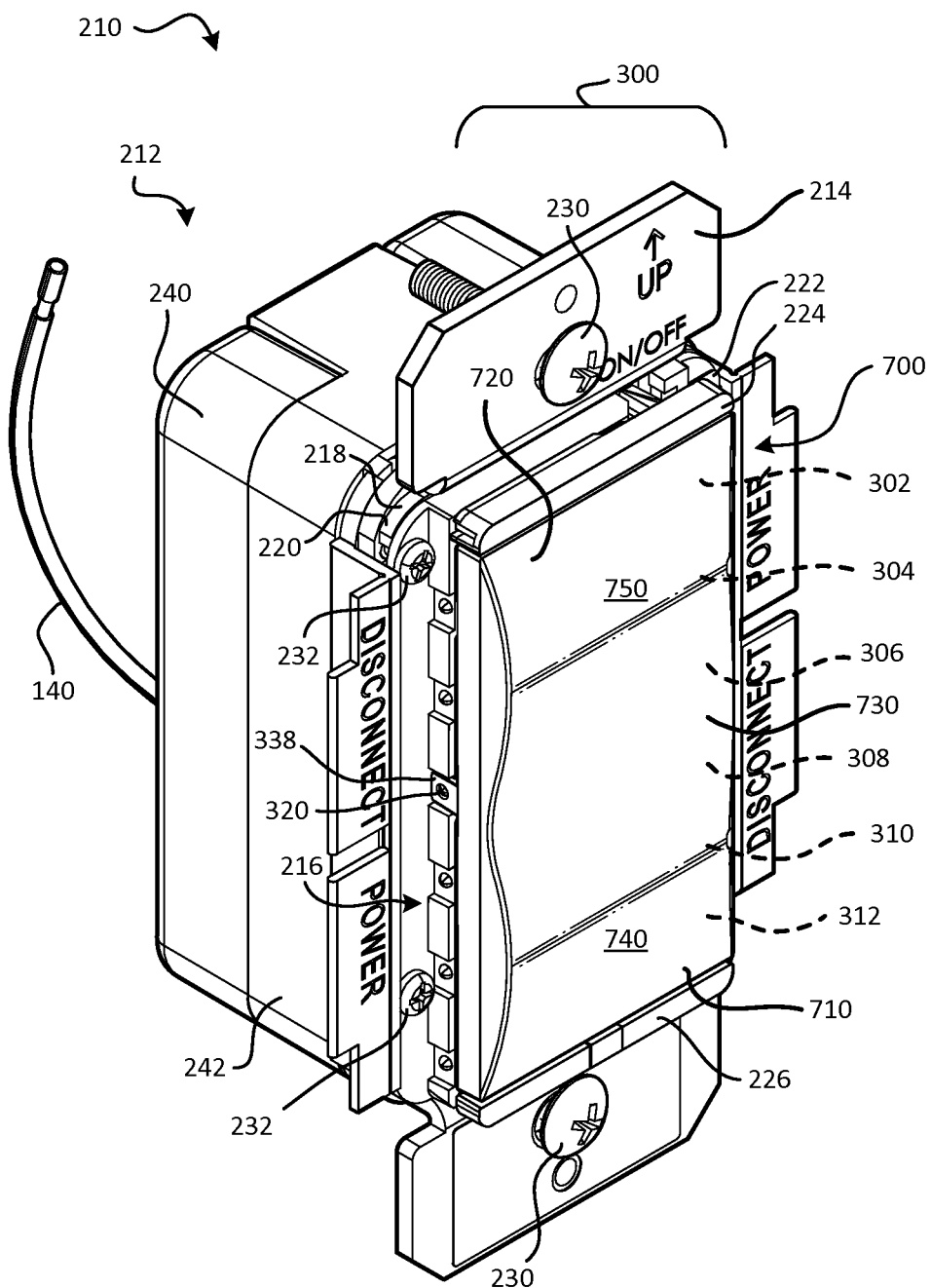
FIG. 7 is a perspective view of the switching system of the system of FIG. 1, in a fully-assembled state with a key element in the form of a rocker.

Referring to FIG. 7, a perspective view illustrates the switching system 130 of the system of FIG. 1, in a fully-assembled state with a key element in the form of a rocker 700. As shown, the rocker 700 may occupy all of the positions 300 on the keypad 216. In alternative embodiments (not shown), smaller rockers may be provided and attached to a keypad along with other key elements 200, as will be shown and described in connection with FIG. 10.

The rocker 700 may have a first end 710, a second end 720, and an intermediate portion 730 between the first end 710 and the second end 720. The rocker 700 may have a first contact surface 740 positioned proximate the first end 710 and a second contact surface 750 positioned proximate the second end 720. The first contact surface 740 and the second contact surface 750 may each have a rounded shape, which may cooperate to define a central recess proximate the intermediate portion 730.

Like the key elements 200 illustrated in previous Figures, the rocker 700 may be attached to the keypad 216, and more precisely, to the first dome 320 and the second dome 322 of one of the positions 300. In the exemplary embodiment of FIG. 7, the rocker 700 may have a first keypad attachment feature 338 and a second keypad attachment feature 340 (shown in FIG. 8 and FIG. 9) positioned proximate the intermediate portion 730. The first keypad attachment feature 338 may pivotably mate with the first dome 320 of the third position 306, and the second keypad attachment feature 340 may pivotably mate with the second dome 322 of the third position 306. Thus, the first dome 320 and the second dome 322 may cooperate to define a fulcrum about which the center of the rocker 700 is able to rotate.

The rocker 700 may pivot in either of two directions. If the user presses on the first contact surface 740, the first end 710 of the rocker 700 may pivot toward the keypad 216 to initiate a switching function. Conversely, if the user presses on the second contact surface 750, the second end 720 of the rocker 700 may pivot toward the keypad 216 to initiate a different switching function. The two switching functions may apply to the same electrical device, and may entail turning the electrical device on or off. Alternatively, the two switching functions may apply to different electrical devices and/or may initiate the performance of other functions besides turning such electrical devices on or off.

Figure 8:
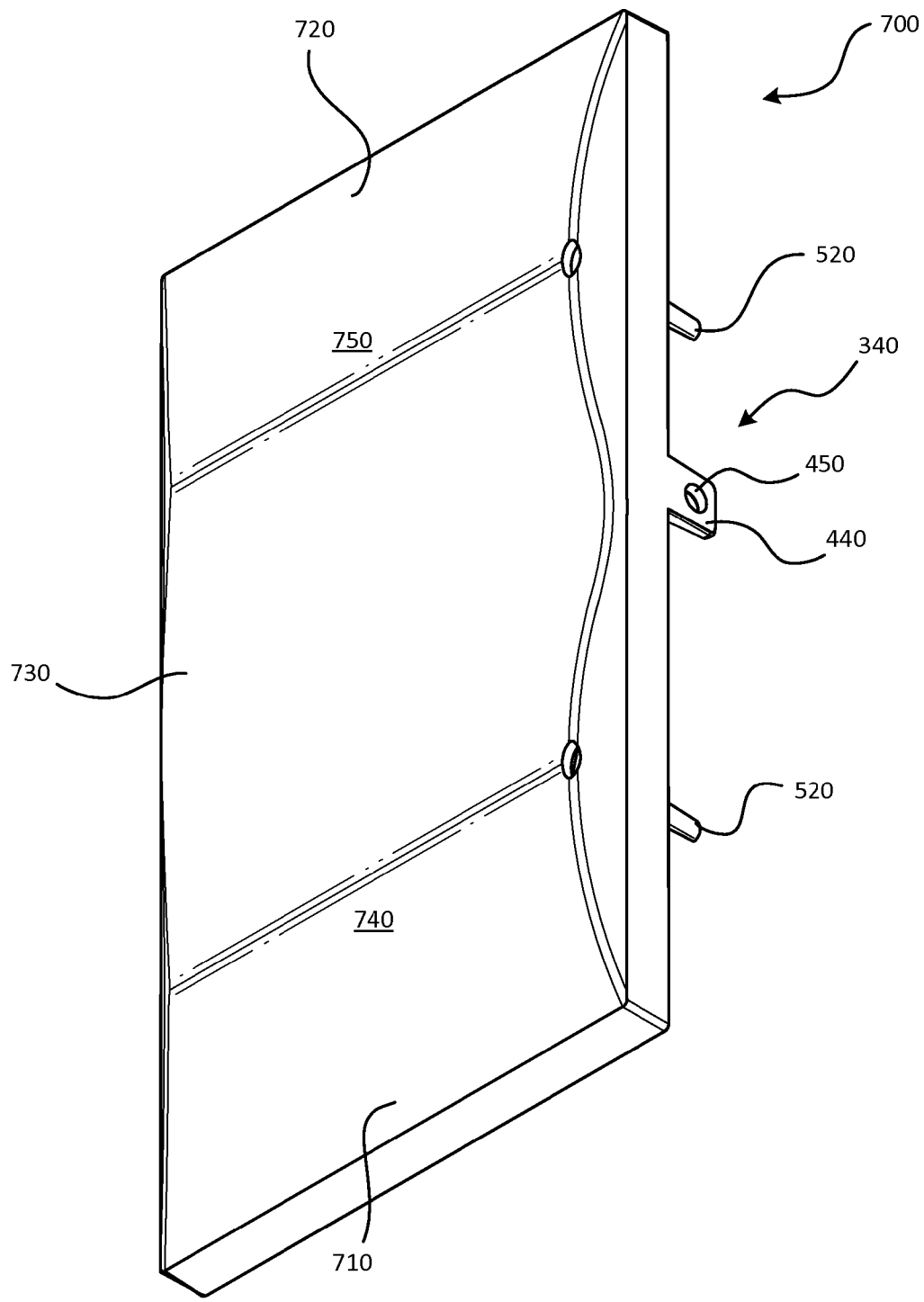
FIG. 8 is a perspective view of a front side of the rocker of FIG. 7.

Referring to FIG. 8, a perspective view illustrates a front side of the rocker 700 of FIG. 7. The shape of the rocker 700 is more clearly depicted. The first keypad attachment feature 338 and the second keypad attachment feature 340 of the rocker 700 may be similar to those of the small key element 202, the medium-sized key element 204, and the large key element 206, and may each include a tab 440 with a hole 450 therein. The rocker 700 may also have posts 520, which may serve to provide structural support and/or retention of components retained within a cavity defined by the rocker 700.

Figure 9:
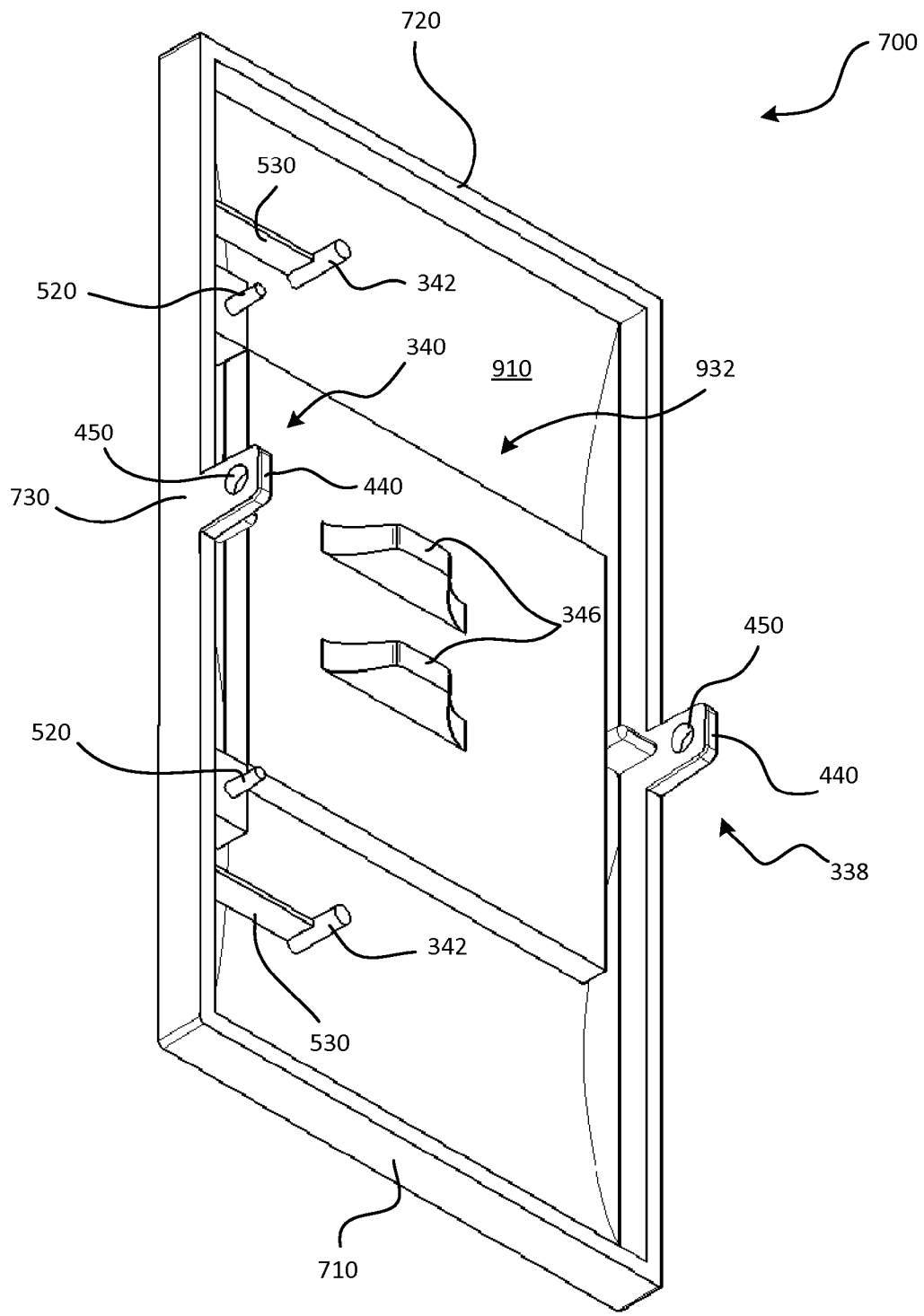
FIG. 9 is a perspective view of a rear side of the rocker of FIG. 7.

Referring to FIG. 9, a perspective view illustrates a rear side of the rocker 700 of FIG. 7. As shown, the shape of the rocker 700 may define a cavity 910 in the rear of the rocker 700. Posts 520 and flanges 530 may extend into the cavity 910 to provide strength or flexural rigidity to the rocker 700, or to help retain components within the cavity 910. More precisely, as in the key elements 200 shown and described previously, a light bar 932 may be nested within the cavity 910 of the rocker 700. The light bar 932 may have two (or optionally more or fewer) plateaus 346, which may extend into the illumination apertures 326 of the keypad 216 to convey light to the first contact surface 740 and/or the second contact surface 750.

Additionally, the rocker 700 may have two protrusions 342 that extend toward the keypad 216 when the rocker 700 is attached to the keypad 216 as in FIG. 7. One of the protrusions 342 may be positioned proximate the first end 710, and the other may be positioned proximate the second end 720.

When the user presses on the first contact surface 740, the protrusion 342 proximate the first end 710 may be urged deeper into the port 324 in which it resides (for example, the port 324 of the seventh position 313), such that the protrusion 342 contacts and/or presses on the corresponding switching element (not shown) on the circuit board 218. Similarly, when the user presses on the second contact surface 750, the protrusion 342 proximate the second end 720 may be urged deeper into the port 324 in which it resides (for example, the port 324 of the second position 304), such that the protrusion 342 contacts and/or presses on the corresponding switching element (not shown) on the circuit board 218.

The rocker 700 may be attached to the keypad 216 through the use of methods like those indicated previously in the discussion of FIG. 4. For example, the tabs 440 of the first keypad attachment feature 338 and the second keypad attachment feature 340 may be flexed outward to enable them to slide over the first dome 320 and the second dome 322, respectively, until the first dome 320 and the second dome 322 are within the holes 450 of the first keypad attachment feature 338 and the second keypad attachment feature 340, respectively. The tabs 440 of the first keypad attachment feature 338 and the second keypad attachment feature 340 may then snap back into their natural (i.e., undeflected) positions with the first dome 320 and the second dome 322 positioned in the holes 450 of the first keypad attachment feature 338 and the second keypad attachment feature 340, respectively.

Figure 10:
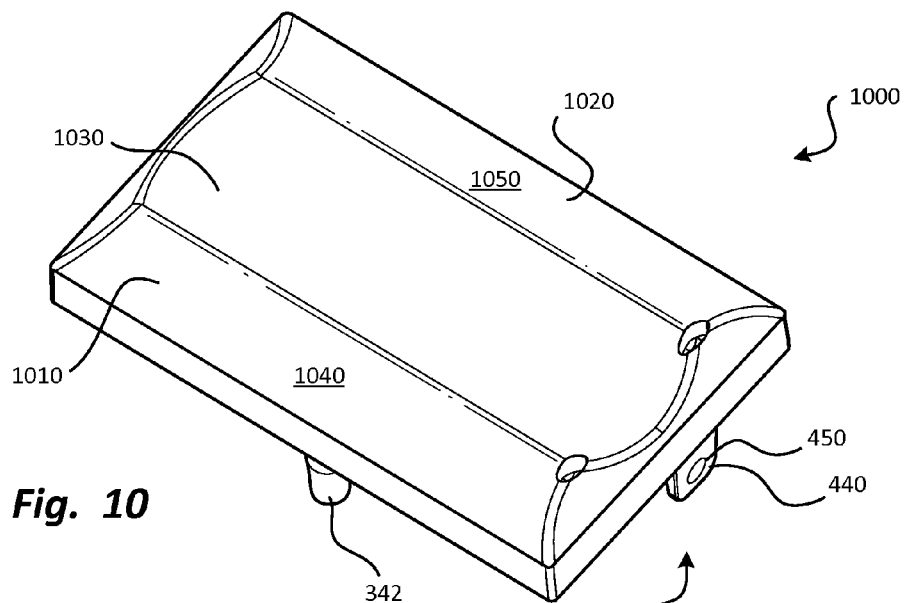
FIG. 10 is a perspective view of a front side of a key element in the form of a small rocker, according to one embodiment of the invention.

Referring to FIG. 10, a perspective view illustrates a front side of a key element in the form of a small rocker 1000, according to one embodiment of the invention. The small rocker 1000 may have a configuration similar to that of the rocker 700, but with a smaller size. Thus, the small rocker 1000 may be designed to occupy, for example, two adjacent positions of the positions 300 on the keypad 216. In the event that the small rocker 1000 is positioned on the sixth position 312 and the seventh position 313, the small rocker 1000 may also occupy the fifth position 310 for a total of three positions.

The small rocker 1000 may have a configuration similar to that of the rocker 700. Thus, the small rocker 1000 may have a first end 1010, a second end 1020, and an intermediate portion 1030 between the first end 1010 and the second end 1020. The small rocker 1000 may have a first contact surface 1040 positioned proximate the first end 1010 and a second contact surface 1050 positioned proximate the second end 1020. The first contact surface 1040 and the second contact surface 1050 may each have a rounded shape, which may cooperate to define a central recess proximate the intermediate portion 1030.

Like the rocker 700, the small rocker 1000 may be attached to the keypad 216, and more precisely, to the first dome 320 and the second dome 322 of one of the positions 300. Thus, the small rocker 1000 may have a first keypad attachment feature 338 (not visible) and a second keypad attachment feature 340 positioned proximate the intermediate portion 1030. The first keypad attachment feature 338 may pivotably mate with the first dome 320 of the position to which the small rocker 1000 is attached, and the second keypad attachment feature 340 may pivotably mate with the second dome 322 of the position. Thus, the first dome 320 and the second dome 322 may cooperate to define a fulcrum about which the center of the small rocker 1000 is able to rotate.

Like the rocker 700, the small rocker 1000 may pivot in either of two directions. If the user presses on the first contact surface 1040, the first end 1010 of the small rocker 1000 may pivot toward the keypad 216 to initiate a switching function. Conversely, if the user presses on the second contact surface 1050, the second end 1020 of the small rocker 1000 may pivot toward the keypad 216 to initiate a different switching function.

The smaller size of the small rocker 1000 may enable multiple small rockers 1000 (for example, three small rockers 1000) to be attached to the keypad 216. Alternatively, one or more small rockers 1000 may be attached to the keypad 216 in combination with other types of key element 200, such as the small key element 202, the medium-sized key element 204, and/or the large key element 206.

Figure 11:
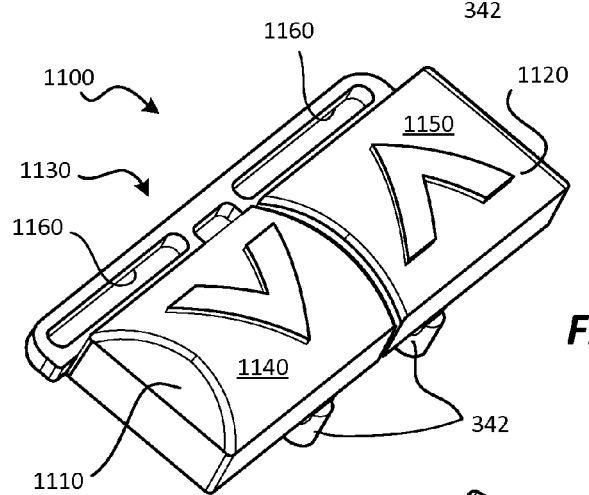
FIG. 11 is a perspective view of a front side of a key element in the form of a split button, according to one embodiment of the invention.

Referring to FIG. 11, a perspective view illustrates a front side of a key element in the form of a split button 1100, according to one embodiment of the invention. Like the rocker 700 and the small rocker 1000, the button 1100 may enable two distinct switching functions to be performed, depending on the manner in which the user actuates the button 1100. The split button 1100 may be designed to occupy the sixth position 312 and the seventh position 313.

More precisely, the button 1100 may have a first portion 1110 and a second portion 1120. The first portion 1110 and the second portion 1120 may be separated from each other by a gap, but may both be attached to or integrally formed with a mounting tab 1130. A first contact surface 1140 may be proximate the first portion 1110 and a second contact surface 1150 may be proximate the second portion 1120.

The mounting tab 1130 may have two slots 1160 that facilitate attachment of the mounting tab 1130 to the keypad 216. Thus, the mounting tab 1130 and the slots 1160 may be keypad attachment features for the split button 1100. The mounting tab 1130 be secured to the space underlying the bottom trim piece 226.

According to one example, the bottom trim piece 226 may be removed, and the slots 1160 of the mounting tab 1130 may be inserted around retention features (not shown) protruding from the space. The bottom trim piece 226 may then be re-attached to hold the mounting tab 1130 in place, thereby keeping the button 1100 in position occupying the sixth position 312 and the seventh position 313. The retention features underlying the bottom trim piece 226 may thus act as key element attachment features.

Figure 12:
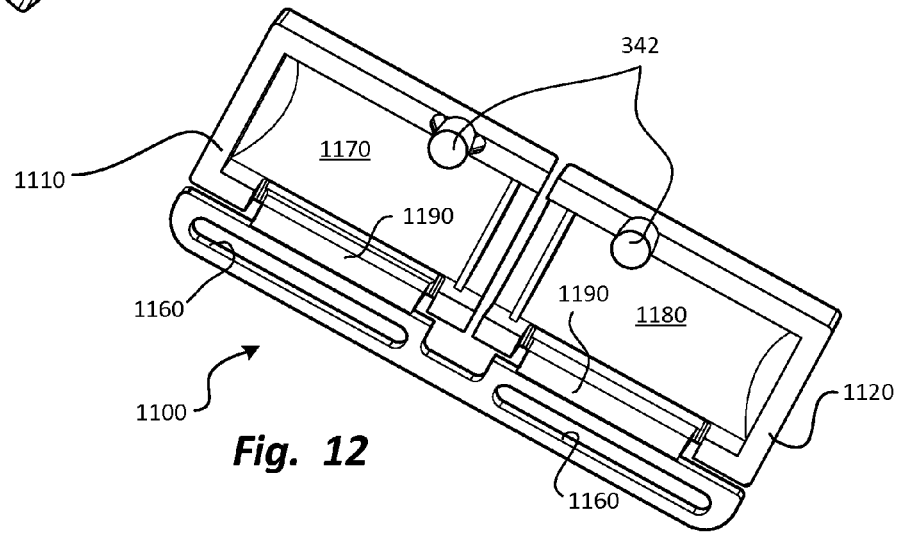
FIG. 12 is a perspective view of a rear side of the split button of FIG. 11.

Referring to FIG. 12, a perspective view illustrates a rear side of the split button 1100 of FIG. 11. As shown, the first portion 1110 may be shaped to define a first cavity 1170, and the second portion 1120 may be shaped to define a second cavity 1180. The first cavity 1170 and/or the second cavity 1180 may be shaped to receive one or more light transmission elements comparable to the small light bar 332, the medium-sized light bar 362, and/or the large light bar 372. Such light transmission elements may be retained by retention elements such as the small retainer 334, the retainer 364, and/or the large retainer 374. In the alternative, the button 1100 may not be designed to receive such elements. Rather, the button 1100 may be opaque and/or may have luminescent elements on the first contact surface 1140 and/or the second contact surface 1150.

As shown in FIG. 12, the first portion 1110 and the second portion 1120 may each be integrally formed with the mounting tab 1130, and coupled to the mounting tab 1130 via flexural hinges 1190. The flexural hinges 1190 may be relatively thin structures that can elastically bend in response to user pressure on the first contact surface 1140 and/or the second contact surface 1150. In this manner, the flexural hinge 1190 may approximate the operation of revolute joints such as hinge joints.

The button 1100 may have two protrusion 342, each of which is positioned proximate one of the first portion 1110 and the second portion 1120. In response to user actuation of the first contact surface 1140 or second contact surface 1150, the first portion 1110 or the second portion 1120 may pivot such that the protrusion 342 located thereon is urged into the port 324 of the sixth position 312 or the seventh position 313 with which it is aligned. The protrusion 342 may then contact a switching element (not shown) on the circuit board 218 to initiate the desired switching function.

The button 1100 is representative of a wide variety of key elements that may be used within the scope of the invention to provide multiple independently-selectable switching functions. Such key elements are not limited to two portions, but may, in some embodiments, have three or more independently-actuated components that can perform three or more different switching functions. Additionally, key elements according to the invention need not be movably attached to a keypad such as the keypad 216, but may instead be rigidly attached, and may have joints or flexural elements that enable motion of a contact surface relative to a keypad.

The switching systems of the present invention may be applied in a wide variety of ways. One exemplary method will be shown and described in connection with FIG. 13.

Figure 13:
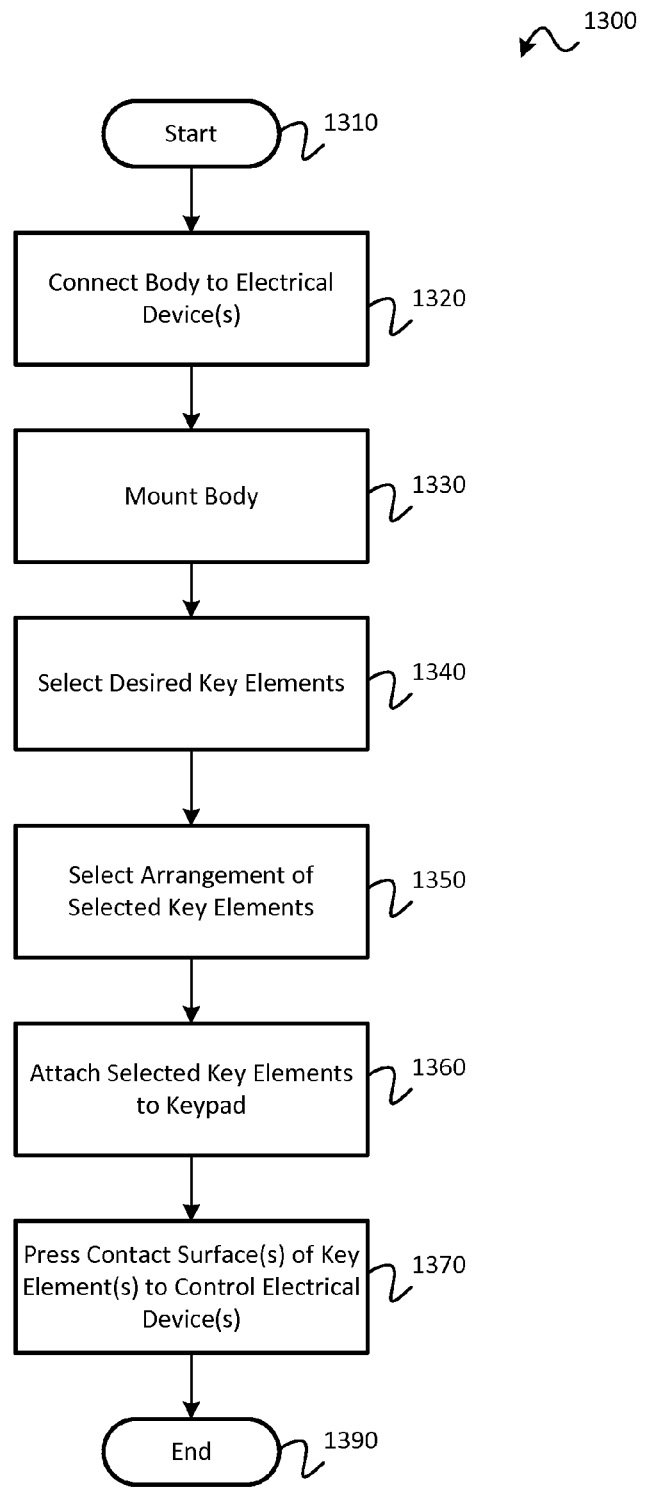
FIG. 13 is a flowchart diagram of a method for configuring and using a switching system, according to one embodiment of the invention.

Referring to FIG. 13, a flowchart diagram illustrates a method 1300 for configuring and using a switching system, according to one embodiment of the invention. The method 1300 will be described as though carried out with the switching system 130 of FIG. 1, but may, in alternative embodiments, be carried out with a different switching system according to the invention. Similarly, other methods besides the method 1300 of FIG. 13 may be used in connection with the switching system 130 and other switching systems of the invention.

The method 1300 may start 1310 with a step 1320 in which the body 210 is connected to the electrical devices to be controlled with the switching system 130, such as the first electrical device 110 and the second electrical device 120 of FIG. 1. As mentioned previously, the body 210 may be connected to the first electrical device 110 and/or the second electrical device 120 via wired and/or wireless connections utilizing any communications protocol known in the art.

The method 1300 may then proceed to a step 1330 in which the body 210 is mounted at the desired location. This may entail securing the body 210 to a wall, frame element, junction box, or the like. This may be done, for example, with the screws 230 shown in FIG. 2 and FIG. 3.

Then, in a step 1340, the desired key elements 200 may be selected from those available for use with the body 210. This may entail selecting one or more key elements 200 from the combination of the key elements 200 of FIG. 2, the rocker 700 of FIG. 7, and/or other key elements 200. If desired, enough of the key elements 200 may be selected to occupy all of the positions 300 of the keypad 216. As mentioned previously, the key elements 200 may optionally include blanks that can be used to cover and/or protect any of the positions 300 that will not be occupied by a key element used for switching.

Once the user has selected the key elements 200 to be used, the method 1300 may proceed to a step 1350 in which the user selects the arrangement of the selected key elements on the keypad 216. This may entail ordering the key elements 200 in a manner that makes sense to the user. Multiple combinations of key element positioning may be possible with a given set of key elements. For example, the key elements 200 of FIG. 2 and FIG. 3 may be arranged in five combinations besides that shown in FIG. 2, for a total of six unique combinations.

Once the arrangement of the selected key elements has been chosen, the method 1300 may proceed to a step 1360 in which the selected key elements are attached to the keypad 216 in the manner determined. This may be done by attaching each of the selected key elements to the keypad 216 using any of the methods described above.

The switching system 130 may then be ready for use. In a step 1370, the user may simply press on the contact surface (for example, the contact surface 336, the contact surface 366, the contact surface 376, the first contact surface 740, and/or the second contact surface 750) that corresponds to the switching function he or she wishes to enable. Thus, the electrical devices connected to the switching system 130 (for example, the first electrical device 110 and the second electrical device 120) may be easily controlled from a switching system 130 that is configured in a manner that makes sense to the user. The method 1300 may then end 1390.

The selection and order of the steps described above is merely exemplary. In alternative embodiments, steps of the method 1300 may be modified, omitted, re-ordered, and/or supplanted with additional steps, within the scope of the present invention.

What is claimed is:

1. A system comprising:
  a body comprising:
    a plurality of connections that are connectable to a plurality of electrical devices; and
    a keypad comprising a plurality of key element attachment features and at least one illumination aperture, wherein the key element attachment features comprise a first key element attachment feature that comprises a first dome that protrudes outward away from the keypad, wherein the keypad comprises a generally rectangular shape comprising a width and a length greater than the width, the keypad comprising a plurality of positions comprising a first position, a second position, and a third position, wherein each key element attachment feature of the plurality of key element attachment features is positioned proximate to one of the positions of the plurality of positions, wherein the plurality of positions are equally spaced apart along the length; and
    a bottom trim piece that supports a light pipe, wherein ambient light is transmitted through the light pipe to a light sensor that detects the ambient light; and
  a first key element that is attachable to the key element attachment features to position the first key element to occupy one or more of the first position, the second position, and the third position, such that the first key element is retained on the keypad independently of any component apart from the keypad and the first key element, wherein a light shines through the at least one illumination aperture to backlight the first key element;
  wherein, at the first position, user actuation of the first key element initiates a first switching function on at least one of the plurality of electrical devices;
  wherein, at the second position, user actuation of the first key element initiates a second switching function on at least one of the plurality of electrical devices; and
  wherein the second switching function is different from the first switching function.

2. The system of claim 1, wherein the key element attachment features comprise:
  the first key element attachment feature that is attachable to the first key element to position the first key element to occupy the first position; and
  a second key element attachment feature that is attachable to the first key element to position the first key element to occupy the second position.

3. The system of claim 2, wherein the first key element comprises a first keypad attachment feature that mates with either of the first key element attachment feature and the second key element attachment feature.

4. The system of claim 3, wherein the first key element further comprises a second keypad attachment feature, wherein the key element attachment features further comprise:
a third key element attachment feature that mates with the second keypad attachment feature in cooperation with mating of the first key element attachment feature with the first keypad attachment feature to position the first key element to occupy the first position; and
a fourth key element attachment feature that mates with the second keypad attachment feature in cooperation with mating of the second key element attachment feature with the first keypad attachment feature to position the first key element to occupy the second position.

5. The system of claim 4, wherein the third key element attachment feature comprises a second dome substantially coaxial with the first dome, wherein the first keypad attachment feature comprises a first tab comprising a first hole sized to receive the first dome and the second keypad attachment feature comprises a second tab comprising a second hole sized to receive the second dome, wherein the second hole is substantially coaxial with the first hole.

6. The system of claim 3, wherein the first key element comprises a button, wherein the button is shaped such that, when the button is attached to the first key element attachment feature, the button comprises:
a first end comprising the first keypad attachment feature, wherein the first keypad attachment feature is pivotably attached to the first key element attachment feature;
a second end comprising a protrusion that extends toward the keypad; and
an intermediate portion that extends between the first end and the second end, the intermediate portion comprising a contact surface that is positioned to receive contact from a digit of a user to urge the protrusion toward the keypad to initiate the first switching function or the second switching function.

7. The system of claim 3, further comprising a second key element comprising a rocker, wherein the rocker is shaped such that, when the rocker is attached to the first key element attachment feature, the rocker comprises:
a first end that occupies at least the first position, the first end comprising:
a first protrusion; and
a first contact surface positioned to receive contact from a digit of a user to urge the first protrusion toward the keypad to initiate the first switching function;
a second end that occupies at least the second position, the second end comprising:
a second protrusion; and
a second contact surface positioned to receive contact from the digit to urge the second protrusion toward the keypad to initiate the second switching function; and
an intermediate portion between the first end and the second end, wherein the intermediate portion comprises the first keypad attachment feature, wherein the first keypad attachment feature is pivotably attached to the first key element attachment feature.

8. The system of claim 3, further comprising a second key element that is larger than the first key element, wherein the second key element is shaped such that, when the second key element is attached to the first key element attachment feature, the second key element occupies the first position and the second position.

9. The system of claim 8, further comprising a third key element that is larger than the second key element, wherein the third key element is shaped such that, when the third key element is attached to the first key element attachment feature, the third key element occupies the first position, the second position, and the third position on the keypad, wherein the third position is offset from each of the first position and the second position.

10. A method comprising:
connecting a body to a plurality of electrical devices, wherein the body further comprises a keypad comprising a first key element attachment feature and at least one illumination aperture, wherein the first key element attachment feature comprises a first dome that protrudes outward away from the keypad, wherein the keypad comprises a generally rectangular shape comprising a width and a length greater than the width, the keypad comprising a plurality of positions comprising a first position, a second position, and a third position, wherein the first key element attachment feature is positioned proximate to one of the positions of the plurality of positions, wherein the plurality of positions are equally spaced apart along the length;
from a first key element and a second key element, selecting the first key element;
attaching the first key element to the first key element feature;
transmitting ambient light through a light pipe to a light sensor that detects the ambient light, wherein the light pipe is supported by a bottom trim piece attached to the body; and
retaining the first key element on the keypad independently of any component apart from the keypad and the first key element and such that user actuation of the first key element initiates a first switching function on at least one of the plurality of electrical devices, wherein a light shines through the at least one illumination aperture to backlight the first key element;
wherein the second key element is shaped differently from the first key element and is attachable to the first key element feature such that the second key element is retained on the keypad independently of any component apart from the keypad and the second key element and such that user actuation of the second key element initiates a second switching function on at least one of the plurality of electrical devices; and
wherein the second switching function is different from the first switching function.

11. The method of claim 10, wherein the keypad further comprises a third key element attachment feature, the method further comprising, with the first key element attached to the first key element attachment feature, attaching the second key element to the third key element attachment feature such that the second key element is adjacent to the first key element.

12. The method of claim 11, wherein the third key element attachment feature comprises a third dome, wherein the keypad further comprises a second dome substantially coaxial with the first dome and a fourth dome substantially coaxial with the third dome, wherein the first key element comprises a first tab comprising a first hole and a second tab comprising a second hole substantially coaxial with the first hole, wherein the second key element comprises a third tab comprising a third hole and a fourth tab comprising a fourth hole substantially coaxial with the third hole, wherein attaching the first dome to the first key element comprises inserting the first dome into the first hole, wherein attaching the third dome to the second key element comprises inserting the third dome into the third hole, the method further comprising:
  attaching the first key element to the second dome by inserting the second dome into the second hole; and
  attaching the second key element to the fourth dome by inserting the fourth dome into the fourth hole.

13. The method of claim 10, wherein the first key element comprises a button comprising a first end comprising a first keypad attachment feature, a second end comprising a protrusion that extends toward the keypad, and an intermediate portion that extends between the first end and the second end, the intermediate portion comprising a contact surface, wherein attaching the first key element attachment feature to the first key element comprises pivotably attaching the first keypad attachment feature to the first key element attachment feature, the method further comprising:
  contacting the contact surface to urge the protrusion toward the keypad to initiate the first switching function.

14. The method of claim 10, wherein the first key element comprises a rocker comprising a first end comprising a first protrusion and a first contact surface, a second end comprising a second protrusion and a second contact surface, and an intermediate portion between the first end and the second end, the intermediate portion comprising a first keypad attachment feature, wherein attaching the first key element attachment feature to the first key element comprises pivotably attaching the first keypad attachment feature to the first key element attachment feature, the method further comprising:
  contacting the first contact surface to urge the protrusion toward the keypad to initiate the first switching function; and
  contacting the second contact surface to urge the second protrusion toward the keypad to initiate a third switching function different from the first switching function.

15. A system comprising
  a body comprising:
    a plurality of connections that are connectable to a plurality of electrical devices; and
    a keypad comprising a first key element attachment feature and at least one illumination aperture, wherein the first key element attachment feature comprises a first dome that protrudes outward away from the keypad, wherein the keypad comprises a generally rectangular shape comprising a width and a length greater than the width, the keypad comprising a plurality of positions comprising a first position, a second position, and a third position, wherein the first key element attachment feature is positioned proximate to one of the positions of the plurality of positions, wherein the plurality of positions are equally spaced apart along the length; and
    a bottom trim piece that supports a light pipe, wherein ambient light is transmitted through the light pipe to a light sensor that detects the ambient light;
  a first key element that is attachable to the first key element attachment feature to facilitate retention of the first key element on the keypad independently of any component apart from the keypad and the first key element and such that user actuation of the first key element initiates a first switching function on at least one of the plurality of electrical devices, wherein a light shines through the at least one illumination aperture to backlight the first key element; and
  a second key element that is attachable to the first key element attachment feature such that the second key element is retained on the keypad independently of any component apart from the keypad and the second key element, wherein the second key element is shaped differently from the first key element such that user actuation of the second key element initiates a second switching function on at least one of the plurality of electrical devices, wherein the second switching function is different from the first switching function.

16. The system of claim 15, wherein the keypad further comprises a third key element attachment feature, wherein the second key element is further attachable to the third key element attachment feature with the first key element attached to the first key element attachment feature such that the second key element is adjacent to the first key element, wherein the second key element is larger than the first key element.

17. The system of claim 16, wherein the third key element attachment feature comprises a third dome, wherein the keypad further comprises a second dome substantially coaxial with the first dome and a fourth dome substantially coaxial with the third dome;
  wherein the first key element comprises a first tab comprising a first hole that mates with the first dome, and a second tab comprising a second hole substantially coaxial with the first hole, that mates with the second dome;
  wherein the second key element comprises a third tab comprising a third hole that mates with the third dome and a fourth tab comprising a fourth hole substantially coaxial with the third hole, that mates with the fourth dome.

18. The system of claim 15, wherein the first key element comprises a button, wherein the button is shaped such that, when the button is attached to the first key element attachment feature, the button comprises:
  a first end comprising a first keypad attachment feature that is pivotably attached to the first key element attachment feature;
  a second end comprising a protrusion that extends toward the keypad; and
  an intermediate portion that extends between the first end and the second end, the intermediate portion comprising a contact surface that is positioned to receive contact from a digit of a user.

19. The system of claim 15, wherein the first key element comprises a rocker, wherein the rocker is shaped such that, when the rocker is attached to the first key element attachment feature, the rocker comprises:
  a first end comprising:
    a first protrusion; and
    a first contact surface positioned to receive contact from a digit of a user to urge the first protrusion toward the keypad to initiate the first switching function;
  a second end comprising:
    a second protrusion; and
    a second contact surface positioned to receive contact from the digit to urge the second protrusion toward the keypad to initiate a third switching function different from the first switching function; and
  an intermediate portion between the first end and the second end, wherein the intermediate portion comprises a first keypad attachment feature that is pivotably attached to the first key element attachment feature.

* * * * *